US009452837B2

(12) United States Patent
Koyama

(10) Patent No.: US 9,452,837 B2
(45) Date of Patent: Sep. 27, 2016

(54) AIRCRAFT LAVATORY UNIT

(71) Applicant: The Yokohama Rubber Co., LTD., Minato-ku, Tokyo (JP)

(72) Inventor: Takashi Koyama, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/435,149

(22) PCT Filed: Oct. 9, 2013

(86) PCT No.: PCT/JP2013/006023
§ 371 (c)(1),
(2) Date: Apr. 10, 2015

(87) PCT Pub. No.: WO2014/057669
PCT Pub. Date: Apr. 17, 2014

(65) Prior Publication Data

US 2015/0259069 A1 Sep. 17, 2015

(30) Foreign Application Priority Data

Oct. 12, 2012 (JP) ................................ 2012-227280

(51) Int. Cl.
*B64D 11/02* (2006.01)
*B64D 25/00* (2006.01)

(52) U.S. Cl.
CPC ............... *B64D 11/02* (2013.01); *B64D 25/00* (2013.01)

(58) Field of Classification Search
CPC ...................................................... B64D 11/02
USPC ...................................................... 244/118.5
See application file for complete search history.

(56) References Cited

U.S. PATENT DOCUMENTS

| | | | | |
|---|---|---|---|---|
| 2,142,396 | A | 1/1939 | Humphries | |
| 8,925,862 | B2 * | 1/2015 | Ehlers | B64D 11/02 244/118.5 |
| 2004/0163170 | A1 * | 8/2004 | Cooper | B64D 11/02 4/664 |
| 2004/0227034 | A1 * | 11/2004 | Wentland | B64D 11/02 244/119 |
| 2005/0116099 | A1 | 6/2005 | Pho et al. | |
| 2005/0241062 | A1 | 11/2005 | Quan | |
| 2008/0179456 | A1 | 7/2008 | Diergardt et al. | |
| 2008/0265092 | A1 | 10/2008 | Cooper et al. | |

(Continued)

FOREIGN PATENT DOCUMENTS

| | | |
|---|---|---|
| EP | 0 221 260 | 5/1987 |
| JP | 2008-239036 | 10/2008 |
| WO | WO 2004/076281 | 9/2004 |

(Continued)

OTHER PUBLICATIONS

International Search Report for International Application No. PCT/JP2013/006023 dated Dec. 24, 2013, 4 pages, Japan.

*Primary Examiner* — Brian M O'Hara
*Assistant Examiner* — Keith L Dixon
(74) *Attorney, Agent, or Firm* — Thorpe North & Western

(57) ABSTRACT

In an aircraft lavatory unit, respective bowls of wash basins of first and second lavatories are provided at locations with the same position along the lengthwise direction of a partition wall and at locations with different positions along the height direction of the partition wall. The bowl of the first lavatory is disposed with a part protruding from the partition wall into the second lavatory side. The bowl of the second lavatory is disposed with a part protruding from the partition wall into the first lavatory side.

20 Claims, 13 Drawing Sheets

(56) References Cited

U.S. PATENT DOCUMENTS

2009/0283636 A1 11/2009 Saint-Jalmes et al.
2012/0012706 A1 1/2012 Ehlers et al.

FOREIGN PATENT DOCUMENTS

WO WO 2007/073938 7/2007
WO WO 2010/108780 9/2010

* cited by examiner

AIRCRAFT LAVATORY UNIT

TECHNICAL FIELD

The present technology relates to an aircraft lavatory unit.

BACKGROUND

Aircraft have a plurality of seats, lavatories, and galleys disposed in a limited space of the fuselage.

Various proposals have been made for the sake of increasing the number of seats.

For example, U.S. Patent Publications US2008/0179456A1 and US2009/0283636A1 disclose movable aircraft lavatory units, and propose aircraft lavatory units whose layouts can be altered.

SUMMARY

Nevertheless, even if the layout of aircraft lavatory units is altered, the area they occupy remains unchanged, and thus there are limits to any expansion in the number of seats.

However, in many cases the lavatories inside of aircraft lavatory units are equipped with wash basins having bowls, and these bowls protrude from walls partitioning the lavatories.

Consequently, if these bowls are simply provided on the walls, then the space within the lavatories becomes narrower in width at the location where bowls are provided. This places a limitation on shortening the width of aircraft lavatory units, and naturally limits increasing the number of seats.

The present technology has been devised in view of the above circumstances, and an object of the present technology is to provide an aircraft lavatory unit that is advantageous in increasing the number of seats.

In order to achieve the above object, the present technology is an aircraft lavatory unit including two lavatories partitioned via a partition wall; and a hand-washing bowl provided for each of the two lavatories. The bowl of each of the two lavatories is provided on the partition wall; the bowl of a first lavatory of the two lavatories is disposed with a part protruding from the partition wall into a second lavatory side of the two lavatories; and the bowl of the second lavatory is disposed with a part protruding from the partition wall into the first lavatory side.

The present technology minimizes the size of the bowl protruding from the partition wall in each lavatory, while ensuring sufficient capacity for washing hands within the bowls, by providing the bowl of each lavatory on the partition wall, and having a part of the bowl of each lavatory protrude on the adjacent lavatory side.

Consequently, the present technology is advantageous in minimizing the width of aircraft lavatory units, and increasing the number of seats within the aircraft.

DETAILED DESCRIPTION

Next, an aircraft lavatory unit according to an embodiment of the present technology will be explained with reference to drawings.

Figure 1:
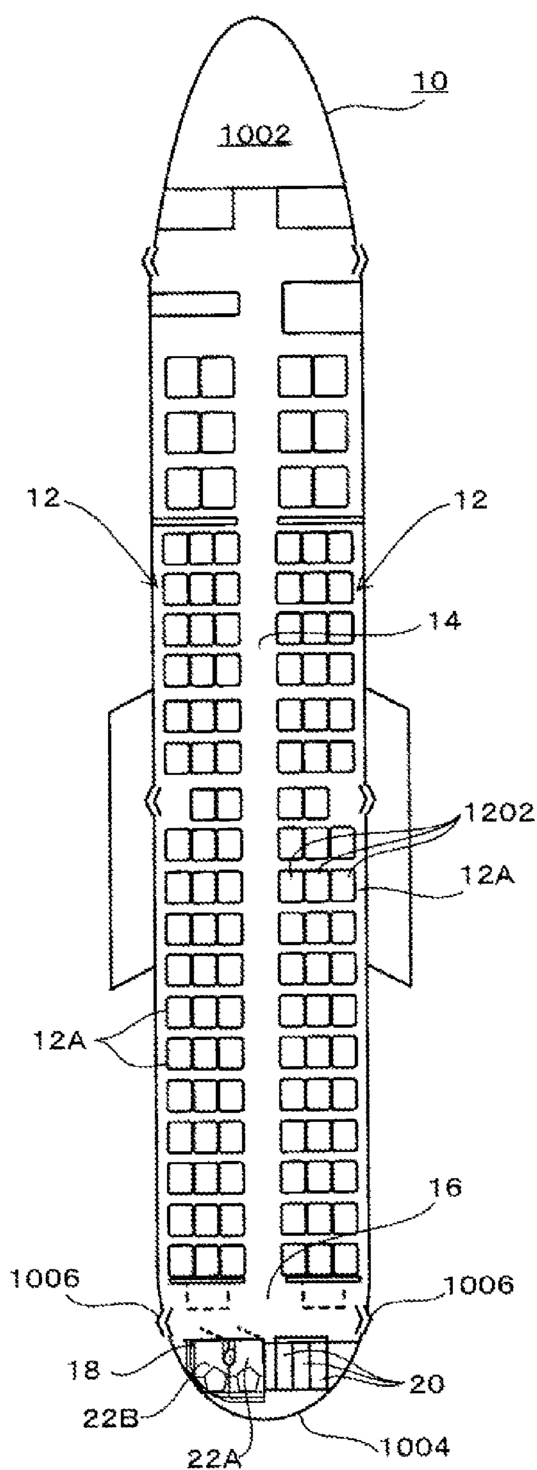
FIG. 1 is an explanatory view depicting the layout of an aircraft interior.
Figure 2:
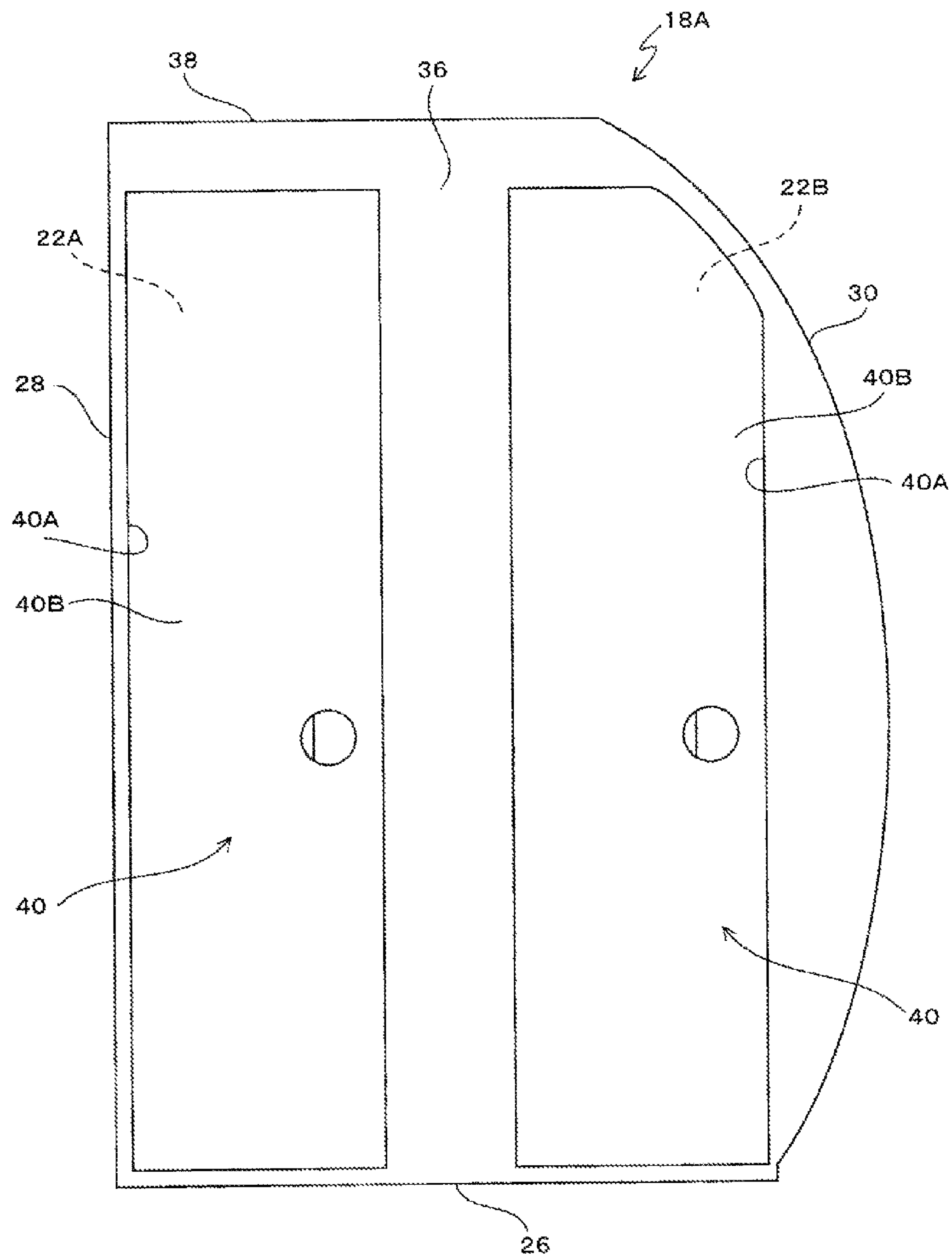
FIG. 2 is a front view of an aircraft lavatory unit according to a first embodiment.

As depicted in FIG. 1, seat groups 12 are provided in the fuselage 10 of an aircraft, and additionally a longitudinal aisle 14 and a latitudinal aisle 16 are provided.

The front part of the fuselage 10 serves as a cockpit 1002, and the rear part serves as a pressure bulkhead 1004.

The longitudinal aisle 14 extends along the center of the fuselage 10 in the longitudinal direction of the fuselage 10.

The seat groups 12 are respectively provided on both the left and right sides of the longitudinal aisle 14, and each seat group 12 is constituted by a plurality of seats 1202 arranged in the latitudinal direction of the fuselage 10, and facing the front of the fuselage 10. In the present embodiment, the seat rows 12A are each constituted by three seats 1202 arranged in a row along the latitudinal direction.

The latitudinal aisle 16 extends from the aircraft doors 1006 at the rear part of the fuselage 10 in the latitudinal direction of the fuselage 10 and to the rear of the seat groups 12, and connects to the longitudinal aisle 14.

An aircraft lavatory unit 18 and galleys 20 are provided arranged in the front of the pressure bulkhead 1004 in the latitudinal direction of the fuselage 10 and to the rear of the latitudinal aisle 16.

First Embodiment

Next, an aircraft lavatory unit 18A according to a first embodiment will be explained with reference to FIGS. 2 to 6.

The aircraft lavatory unit 18A has two lavatories: a first lavatory 22A and a second lavatory 22B.

A body frame 24 of the aircraft lavatory unit 18A has a bottom wall 26, a mutually opposing first side wall 28 and a second side wall 30 standing up from the bottom wall 26, a partition wall 32 partitioning the space between the side walls 28, 30 into two spaces, a rear wall 34 connecting one end of the side walls 28, 30 and the partition wall 32, a front wall 36 connecting the other end of the side walls 28, 30 and the partition wall 32, and a ceiling wall 38.

The partition wall 32 has a height reaching from the bottom wall 26 to the ceiling wall 38, and a length from the rear wall 34 to the front wall 36 side.

Furthermore, as depicted in FIG. 4, the second side wall 30 and the rear wall 34 are respectively formed into curved shapes corresponding to the body shape of the fuselage 10 in which the aircraft lavatory unit 18A is installed and the shape of the pressure bulkhead 1004, and the first side wall 28, bottom wall 26 and ceiling wall 38 are properly deformed matching the second side wall 30 and rear wall 34.

Doorways 40 are provided on the front wall 36 so that it is possible to enter in and exit from the spaces on either side of the partition wall 32. These doorways 40 comprise openings 40A formed on the front wall 36, and doors 40B that open and close the openings 40A.

Furthermore, although the body frame 24 is structurally formed as an integrated body, it may be desirably constituted to be dividable, such as at the location of the partition wall 32, in order to simplify handling during transport or installation.

Thus, a first lavatory 22A and a second lavatory 22B are formed by installing respective toilets 41 and wash basins 42 in the spaces on either side of the partition wall 32.

The toilets 41 in the first and second lavatories 22A, 22B are disposed at locations in front of the rear wall 34.

Figure 5:
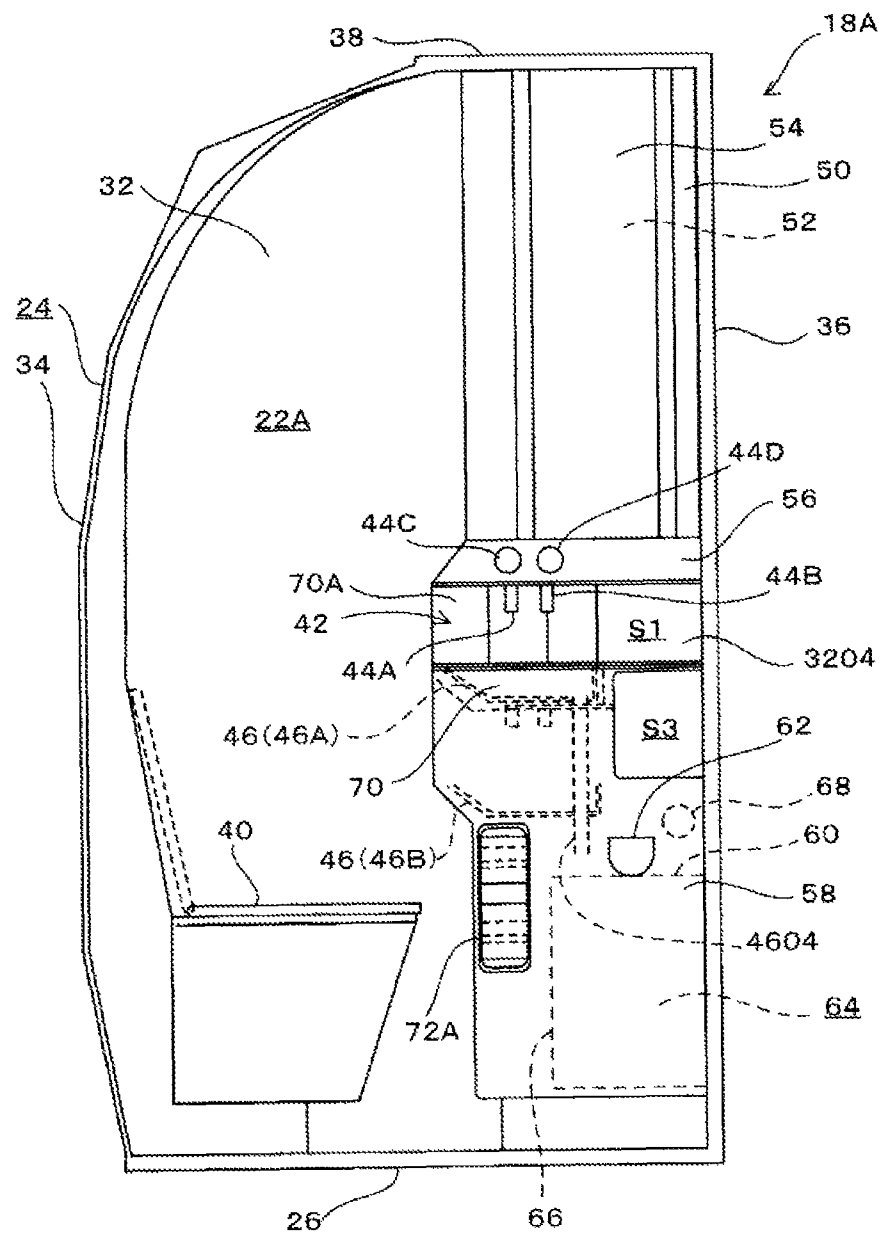
FIG. 5 is a view along arrow C in FIG. 4A.
Figure 6:
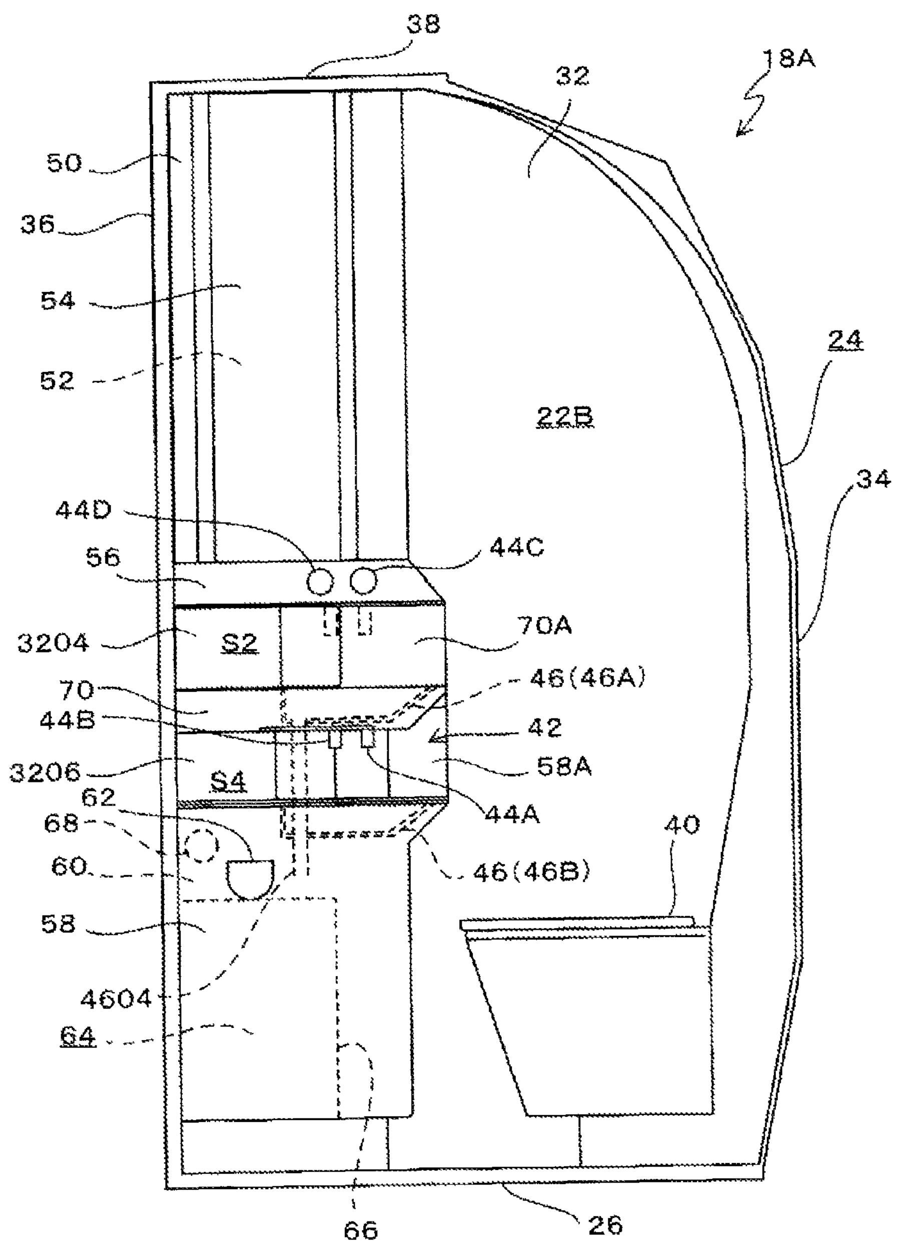
FIG. 6 is a view along arrow D in FIG. 4A.

In addition, as depicted in FIG. 5 and FIG. 6, the wash basins 42 in the first and second lavatories 22A, 22B are provided in the middle part of the partition wall 32 in the height direction, and on the end of the partition wall 32 in the lengthwise direction toward the front wall 36 side.

The wash basins 42 have water faucets 44A, liquid soap dispensers 44B and bowls 46. By operating water faucet buttons 44C above the water faucets 44A, water is emitted from the water faucets 44A, and by operating soap dispenser buttons 44D above the liquid soap dispensers 44B, liquid soap is emitted from the liquid soap dispensers 44B. Furthermore, reference numeral 4602 in the drawings indicates a drain outlet for the bowl 46, and reference numeral indicates the drain pipe 4604 connected to the drain outlet 4602.

The bowls 46 in the first and second lavatories 22A, 22B are provided close to waist height to allow users to handwash while standing.

Figure 4A:
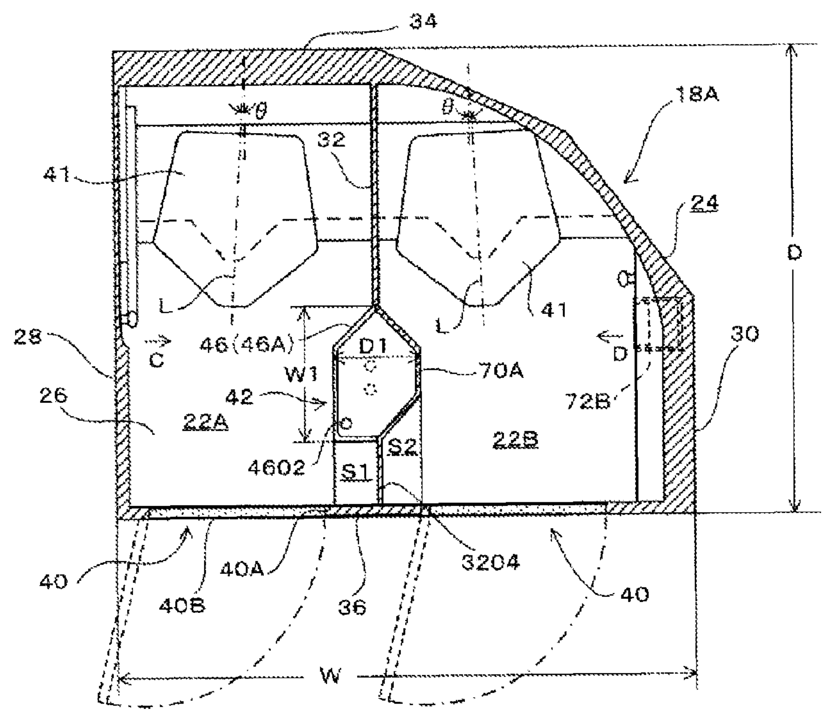
FIG. 4A is a cross-sectional view of FIG. 3 along a line A-A.

As depicted in FIG. 4A, the bowl 46A of the first lavatory 22A is disposed with a part protruding from the partition wall 32 into the second lavatory 22B side. Specifically, the bowl 46A of the first lavatory 22A is disposed with a part positioned on the second lavatory 22B side protruding from the partition wall 32 into the second lavatory 22B side.

The bowl 46A has a width W1 and depth D1, and in this embodiment, a half of the depth D1 in the depth D1 direction is protruding into the second lavatory 22B.

Figure 3:
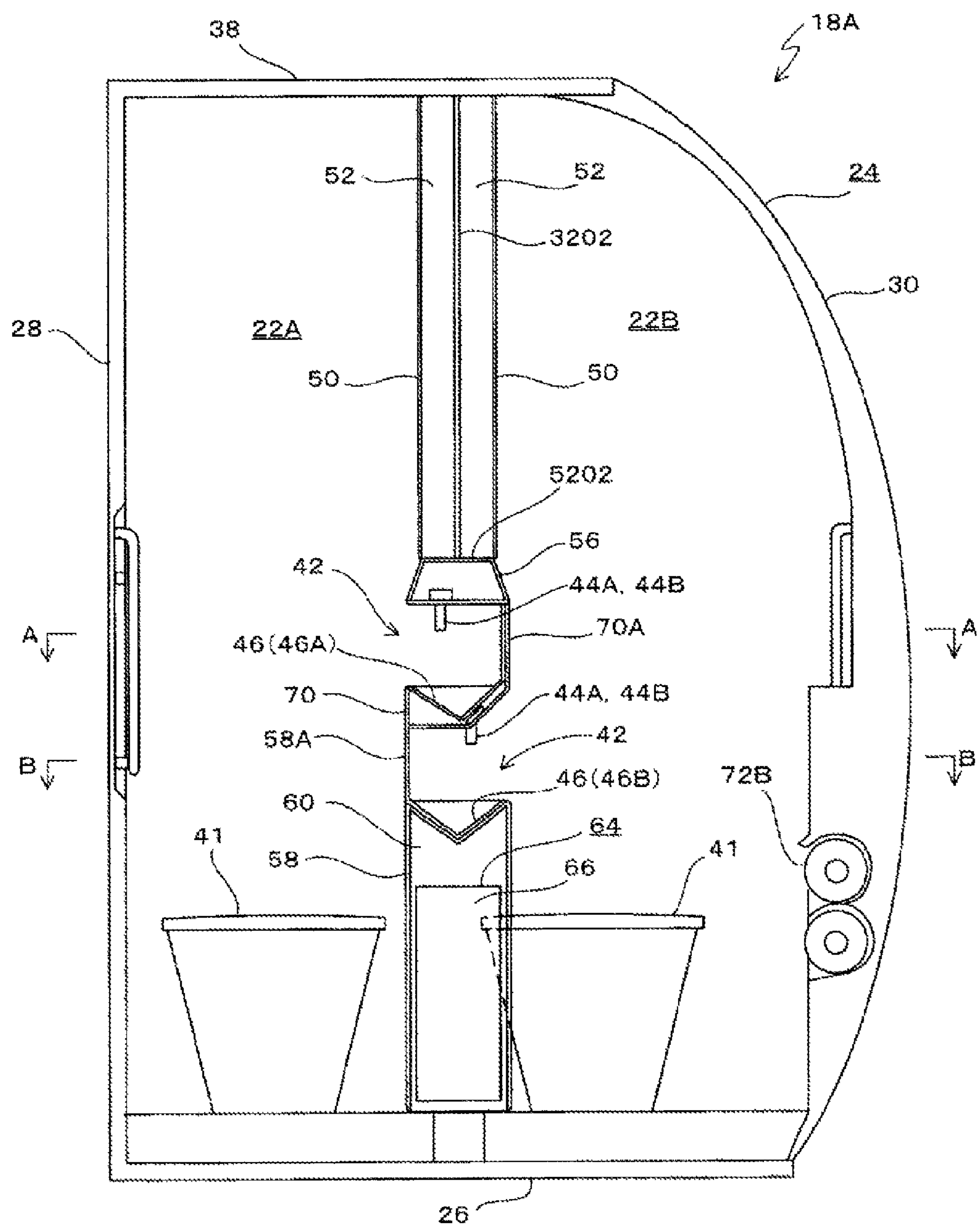
FIG. 3 is a cross-sectional front view of an aircraft lavatory unit cut at a bowl section of the wash basin.

In this case, since FIG. 4A is a cross-sectional view of FIG. 3 along a line A-A, the depth D1 of the bowl 46A is the size of the external form of the bowl 46A section in the width W direction of the aircraft lavatory unit 18A, including the thickness of the wall 70A partitioning the first lavatory 22A and second lavatory 22B at the back side of the bowl 46A, when cutting a portion directly above the bowl 46A by a plane parallel to the bottom wall 26 of the body frame 24 and viewed down from the plane. Furthermore, the widthwise direction W of the aircraft lavatory unit 18A is also orthogonal to the partition wall 32.

Figure 4B:
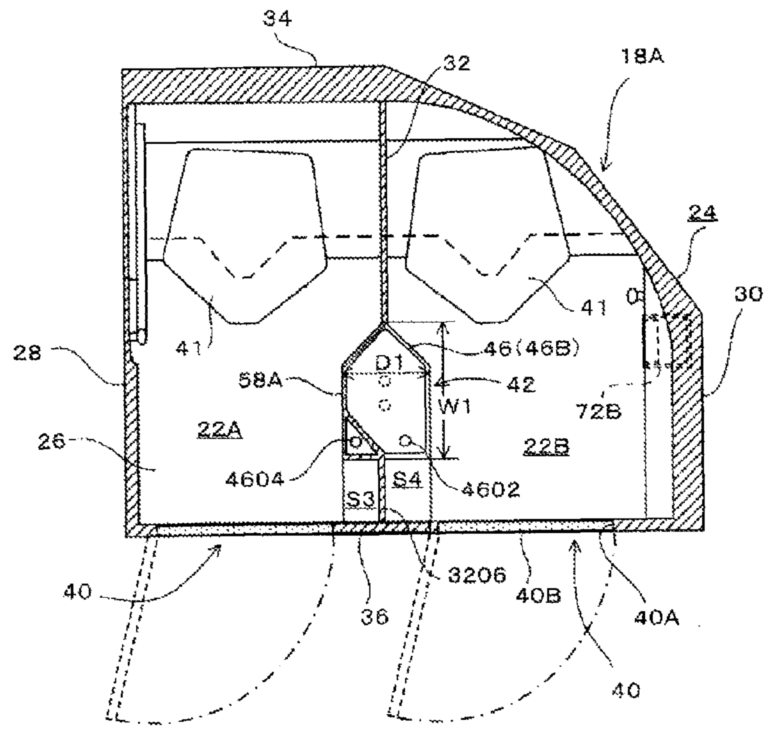
FIG. 4B is a cross-sectional view of FIG. 3 along a line B-B.

In addition, as depicted in FIG. 4B, the bowl 46B of the second lavatory 22B is disposed with a part protruding from the partition wall 32 into the first lavatory 22A side. Specifically, the bowl 46B of the second lavatory 22B is disposed with a part positioned on the first lavatory 22A side protruding from the partition wall 32 into the first lavatory 22A side.

The bowl 46B has a width W1 and depth D1, and in this embodiment, a half of the depth D1 in the depth D1 direction is protruding into the first lavatory 22A.

In this case, since FIG. 4B is a cross-sectional view of FIG. 3 along a line B-B, the depth D1 of the bowl 46B is the size of the external form of the bowl 46B section in the width W direction of the aircraft lavatory unit 18A, including the thickness of the wall 58A partitioning the first lavatory 22A and second lavatory 22B at the back side of the bowl 46B, when cutting a portion directly above the bowl 46B by a plane parallel to the bottom wall 26 of the body frame 24 and viewed down from the plane.

Thus, by having a part of the bowls 46A, 46B protrude on the adjacent lavatory 22A, 22B side, sufficient area for washing hands within the bowls 46A, 46B is ensured, and additionally, sufficient space for washing hands above the bowls 46A, 46B is ensured, the size of the bowls 46A, 46B protruding from the partition wall 32 into the first and second lavatories 22A, 22B are minimized, and the width W of the aircraft lavatory unit 18A (see FIG. 4A) is minimized.

In the present embodiment, the bowls 46A, 46B of the first and second lavatories 22A, 22B are provided at locations with the same position in the lengthwise direction of the partition wall 32, and locations with different positions in the height direction of the partition wall 32, the size of the width W1 of the bowl 46A and the width W1 of the bowl 46B are the same, and the size of the depth D1 of the bowl 46A and the depth D1 of the bowl 46B are the same.

More specifically, the bowl 46A of the first lavatory 22A is provided at a location higher than the bowl 46B of the second lavatory 22B, ensuring a sufficient capacity for washing hands within the bowl 46A, and additionally ensuring a sufficient space for washing hands above the bowl 46A.

In addition, the bowl 46B of the second lavatory 22B is provided at a location lower than the bowl 46A of the first lavatory 22A, ensuring a sufficient capacity for washing hands within the bowl 46B, and additionally ensuring a sufficient space for washing hands above the bowl 46B, that is, ensuring a sufficient space for washing hands beneath the bowl 46A of the first lavatory 22A.

By this, when the bowls 46A, 46B of the first and second lavatories 22A, 22B are arranged vertically at locations with the same position in the lengthwise direction of the partition wall 32, the parts of the bowls 46A, 46B protruding inside the first and second lavatories 22A, 22B are arranged vertically, which is advantageous in shortening the depth D of the lavatory unit (see FIG. 4A), in comparison to cases in which the bowls 46A, 46B of the first and second lavatories 22A, 22B are arranged at different locations in the lengthwise direction of the partition wall 32.

In addition, as depicted in FIG. 3, parts of the bowls 46A, 46B of the two lavatories 22A, 22B that are ½ the depth D protrude from the lavatories 22A, 22B in which the bowls 46A, 46B are used, and from the partition wall 32 into the adjacent lavatories 22A, 22B. Hence, the sizes of the bowls 46A, 46B protruding from the partition wall 32 into the lavatories 22A, 22B are the same, and there is no unevenness in the vertical direction at the locations where the bowls 46A, 46B are vertically arranged, which is advantageous in enhancing the design properties of the lavatories 22A, 22B.

As depicted in FIG. 3, a section 3202 of the partition wall 32 in the first and second lavatories 22A, 22B is positioned at a location above the bowl 46 of the first lavatory 22A, and a bottom plate 5202 is secured to the bottom end of this section 3202 of the partition wall 32.

Then, top decorative panels 50 opposing the section 3202 of the partition wall 32 is provided between the bottom plate

5202 and the ceiling wall 38. Storage racks 52 for a paper towel and tissue paper are provided by the section 3202 of the partition wall 32 and the top decorative panels 50 in the first and second lavatories 22A, 22B. As depicted in FIG. 5 and FIG. 6, these storage racks 52 are connected to the front wall 36.

A long and narrow mirror 54 is secured vertically in the middle of the top decorative panel 50 in the widthwise direction, and the section of the top decorative panel 50 to which the mirror 54 is secured is openably and closeably provided.

As depicted in FIG. 3, a skirt section 56 opposing the bowl 46A is provided straddling the first and second lavatories 22A, 22B on the bottom of the bottom plate 5202 at a location some distance above the bowl 46A. As depicted in FIG. 5 and FIG. 6, a water faucet button 44C and a liquid soap dispenser button 44D are provided on this skirt section 56.

In addition, as depicted in FIG. 3, a single storage chamber 60 covered by a bottom decorative panel 58 is provided straddling the first and second lavatories 22A, 22B, below the bowl 46 of the second lavatory 22B.

Thus, as depicted in FIG. 5 and FIG. 6, respective trash chutes 62 are provided at a position on the bottom decorative panel 58 located in the first lavatory 22A and a position on the bottom decorative panel 58 located in the second lavatory 22B, and a single trash receptacle 64 shared by the first and second lavatories 22A, 22B is provided in the storage chamber 60.

The trash receptacle 64 has a single trash can 66 and a single fire extinguisher 68.

The trash can 66 is housed within the storage chamber 60 and receives trash deposited from the trash chutes 62.

The fire extinguisher 68 will spray a fire-extinguishing agent from a spray nozzle into the interior of the trash can 66 at a set temperature or above. A conventionally known inert gas, such as chlorofluorocarbon gas or halon gas, can be used as the fire-extinguishing agent, and a commercially available product can be used for the fire extinguisher 68.

The trash can 66 is put in and taken out from the storage chamber 60 through an opening provided on the front wall 36 or an opening provided on the bottom decorative panel 58 not depicted in the drawings. These openings are sealed with a lid plate.

The use of a single trash receptacle 64 shared by two lavatories of the first lavatory 22A and the second lavatory 22B is advantageous in shortening the width of the aircraft lavatory unit 18A, and additionally ensures convenience, while being advantageous in reducing the number of components, simplifying assembly and reducing costs.

Furthermore, as depicted in FIG. 3, the bowl 46A of the first lavatory 22A is covered laterally and downward by a decorative panel 70, a wall 70A stands up from the end part of this decorative panel 70 on the second lavatory 22B side, and the top of this wall 70A is connected to the bottom end of the skirt section 56 on the second lavatory 22B side.

In addition, as depicted in FIG. 4A, FIG. 5 and FIG. 6, a section 3204 of the partition wall 32 is positioned between the top surface of the decorative panel 70, which is positioned on the same surface as the top end surface of the bowl 46A, and the bottom surface of the skirt section 56, and between the end part of the bowl 46 of the first lavatory 22A on the front wall 36 side and the front wall 36.

Thus, respective spaces S1, S2 for small objects are provided in the first and second lavatories 22A, 22B on both sides of the section 3204 of the partition wall 32 on the top surface of the decorative panel 70.

In addition, as depicted in FIG. 3, the bowl 46 of the second lavatory 22B is covered laterally by the bottom decorative panel 58, the wall 58A stands up from a location on the bottom decorative panel 58, which is positioned at the end part of the bowl 46B of the second lavatory 22B on the first lavatory 22A side, and the top of this wall 58A is connected to the decorative panel 70 laterally covering the bowl 46 of the first lavatory 22A on the first lavatory 22A side.

In addition, as depicted in FIG. 4B, FIG. 5 and FIG. 6, a section 3206 of the partition wall 32 is positioned between the top surface of the bottom decorative panel 58, which is positioned on the same surface as the top end surface of the bowl 46B of the second lavatory 22B, and the bottom surface of the bottom decorative panel 58, and between the end part of the bowl 46 of the second lavatory 22B on the front wall 36 side and the front wall 36.

Respective spaces S3, S4 for small objects are provided in the first and second lavatories 22A, 22B on both sides of the section 3206 of the partition wall 32 on the top surface of the bottom decorative panel 58.

In addition, as depicted in FIG. 5, in the first lavatory 22A, a toilet paper holder 72A holding toilet paper is provided on the end part of the bottom decorative panel 58 some distance from the front wall 36.

In addition, as depicted in FIG. 3, FIG. 4A and FIG. 4B, in the second lavatory 22B, a toilet paper holder 72B holding toilet paper is provided at a location on the second side wall 30 towards the toilet 41.

In addition, in the present embodiment, as depicted in FIG. 4A, the toilets 41 in the respective lavatories 22A, 22B are disposed inclined at an angle θ relative to the partition wall 32, so that the center lines L passing through the centers of the toilets 41 in the widthwise direction are farther from the partition wall 32 as they reach the front of the toilets 41. This θ may be within a range of 3 to 5 degrees, for example.

In the present embodiment, the width W of the aircraft lavatory unit 18A is shortened to the minimum limit, so the width of each lavatory 22A, 22B is also shortened. When the toilets 41 are disposed so that the center lines L passing through the centers of the toilets 41 in the widthwise direction are parallel to the partition wall 32 and when a tall person sits on the a toilet seat, the knees of the tall person may touch the end part on the rear wall 34 side of the bottom decorative panel 58 positioned below the bowls 46A, 46B.

Therefore, as in the present embodiment, if the toilets 41 are disposed inclined at an angle θ relative to the partition wall 32, so that the center lines L passing through the centers of the toilets 41 in the widthwise direction are farther from the partition wall 32 as they reach the front of the toilets 41, it is possible to avoid knees touching the end part on the rear wall 34 side of the bottom decorative panel 58 without enlarging the width of the lavatories 22A, 22B, even if a tall person sits on the toilet seat.

Consequently, this is advantageous in shortening the width W of the aircraft lavatory unit 18A without any loss in its usability.

Second Embodiment

Next, an aircraft lavatory unit 18B according to a second embodiment will be explained with reference to FIGS. 7 to 10.

In the second embodiment, there is a surplus in the depth D of the aircraft lavatory unit 18B, therefore the priority is to arrange the bowls 46A, 46B at the heights such that users most easily use. Instead of disposing the bowls 46A, 46B vertically, they are arranged laterally.

Furthermore, this explanation shall emphasize differences from the first embodiment. Therefore, portions and members that are the same as in the first embodiment are assigned the same reference numerals and their explanations shall be omitted.

Figure 8:
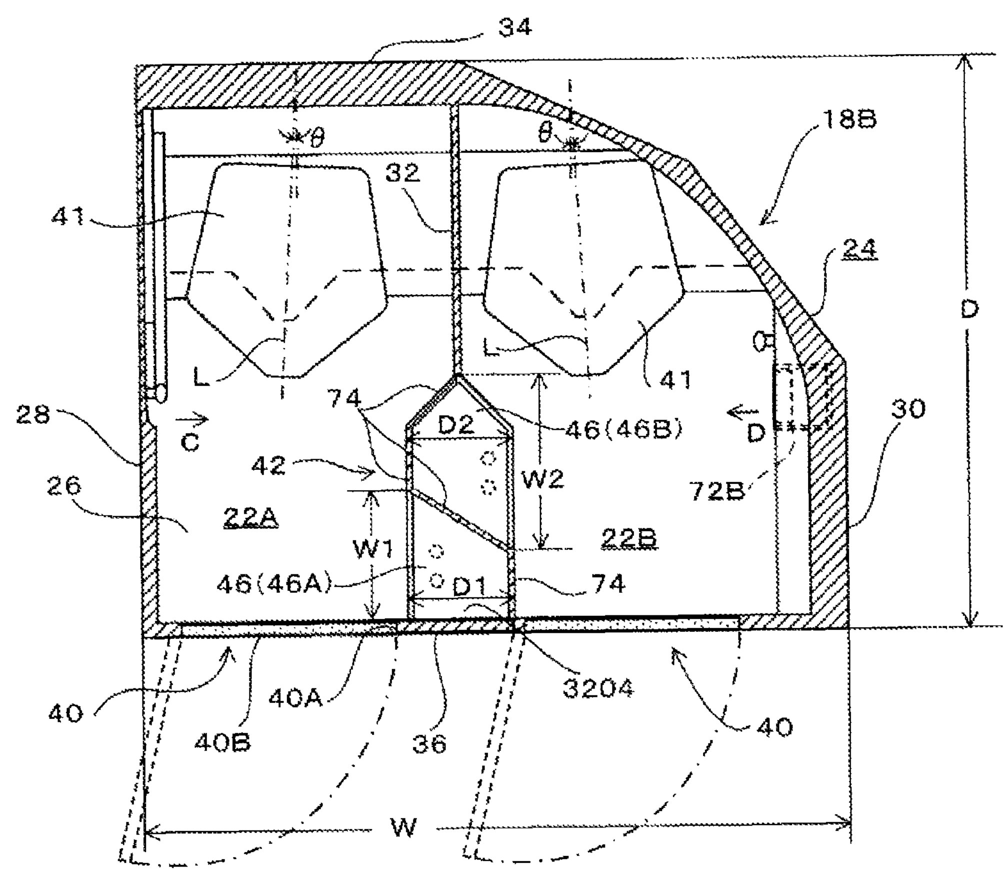
FIG. 8 is a cross-sectional view of a line A-A in FIG. 7.

As depicted in FIG. 8, the bowls 46A, 46B of the first and second lavatories 22A, 22B, unlike in the first embodiment, are provided at locations with the same position in the height direction of the partition wall 32, and locations with different positions in the lengthwise direction of the partition wall 32.

Figure 7:
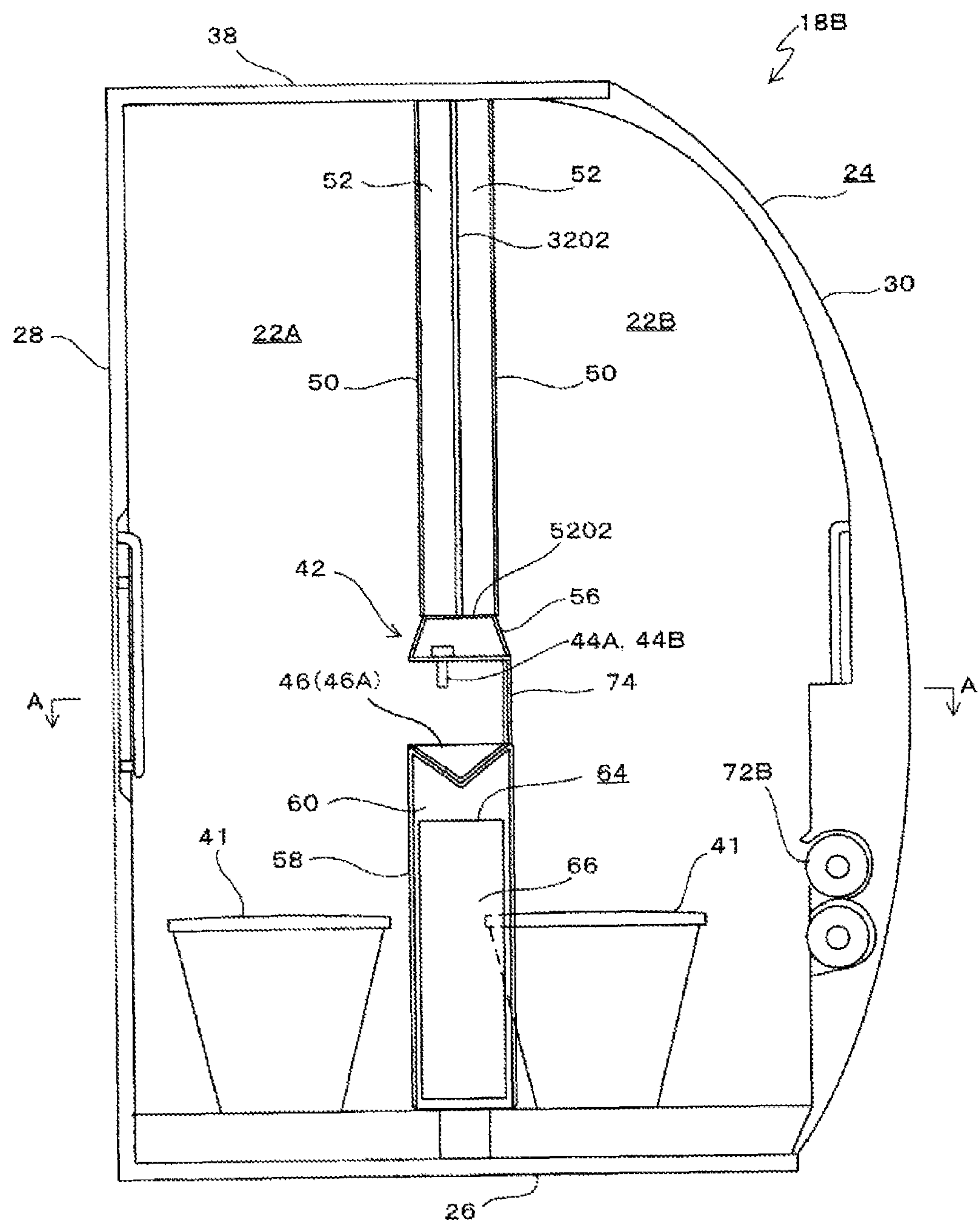
FIG. 7 is a cross-sectional front view of an aircraft lavatory unit according to a second embodiment cut at a bowl section of a first lavatory.
Figure 9:
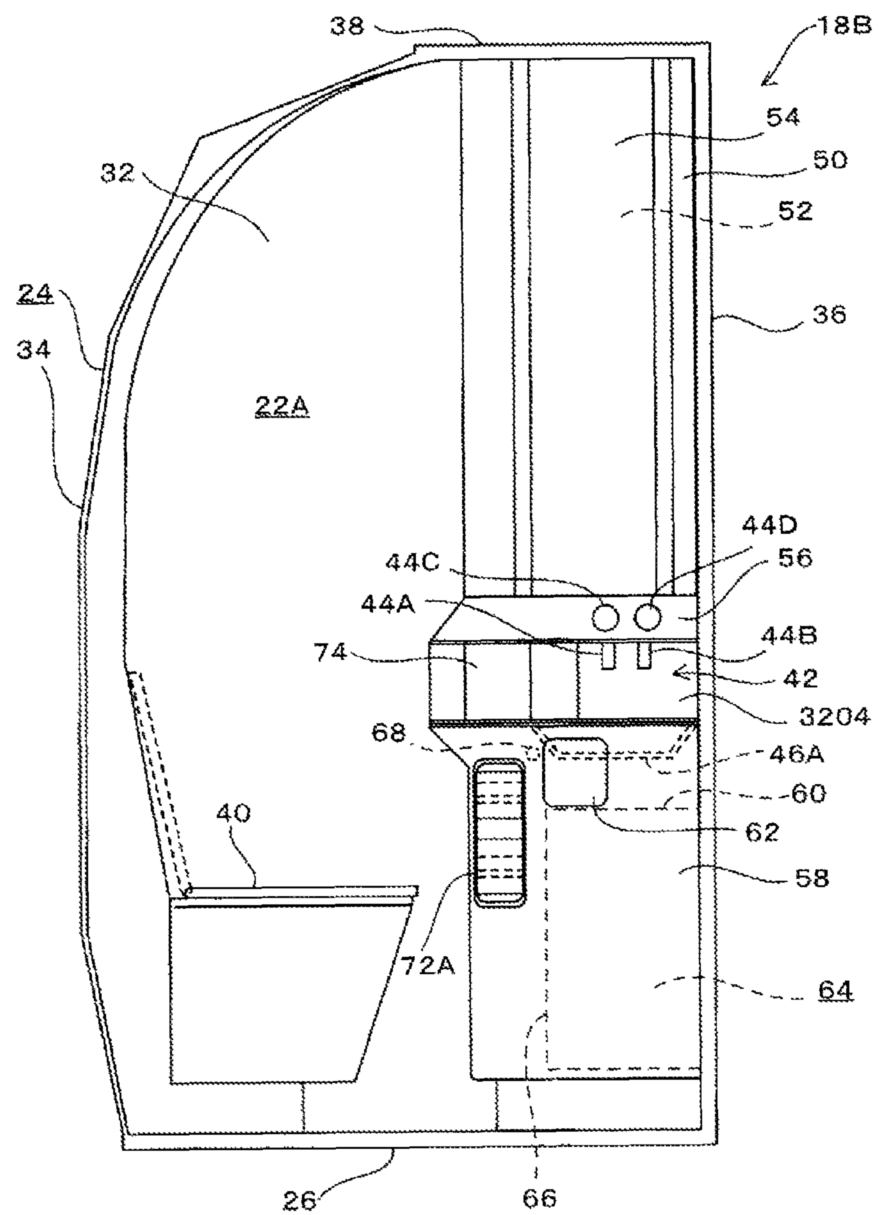
FIG. 9 is a view along arrow C in FIG. 8.
Figure 10:
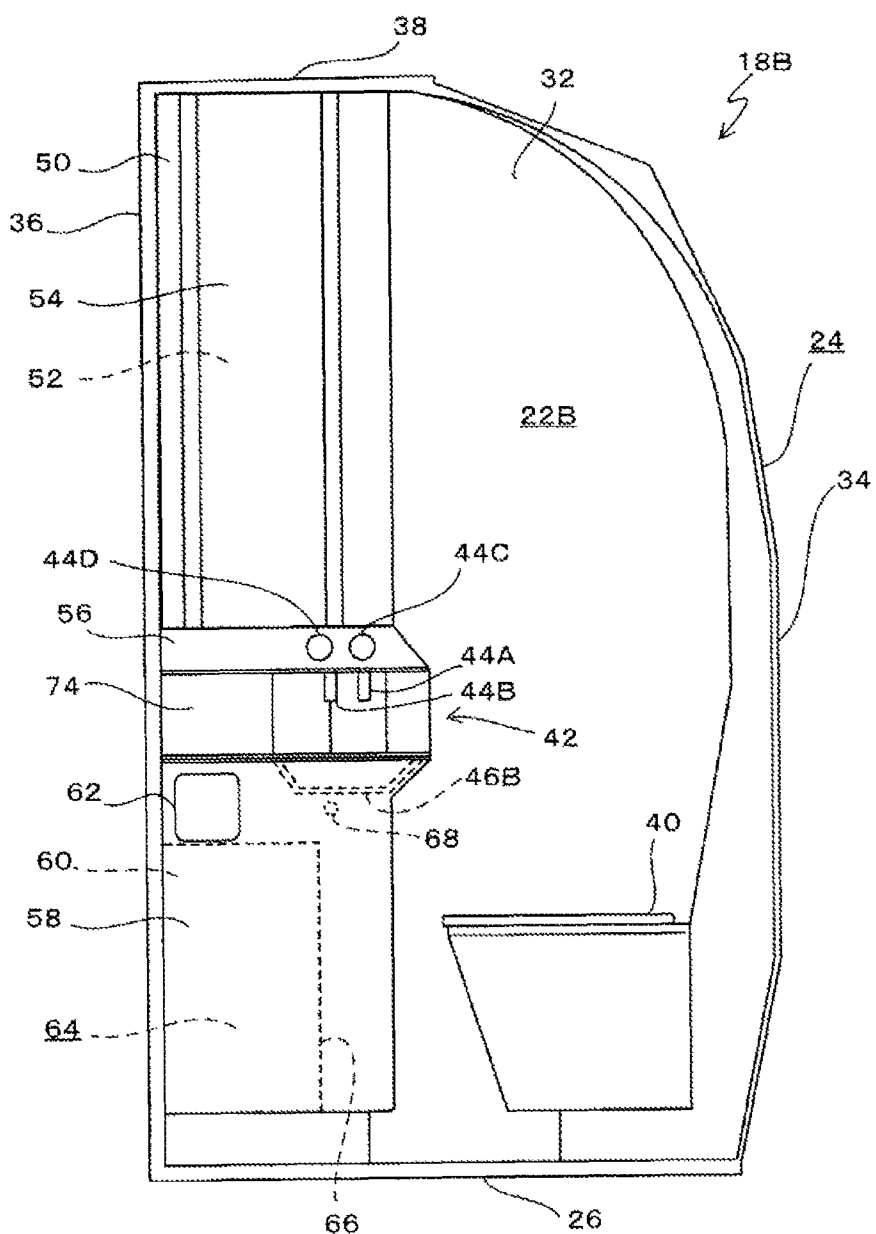
FIG. 10 is a view along arrow D in FIG. 8.

As depicted in FIG. 7, FIG. 9 and FIG. 10, storage racks 52 are provided above the bowls 46A, 46B of the first and second lavatories 22A, 22B, and a skirt section 56 is provided straddling the first and second lavatories 22A,22B on the bottom part the storage racks 52.

In addition, a single storage chamber 60 covered by a bottom decorative panel 58 is provided straddling the first and second lavatories 22A, 22B, below the bowls 46A, 46B of the first and second lavatories 22A, 22B.

Thus, a wall 74 extending along the edge of the bowl 46A on the second lavatory 22B side, and extending along the edge of the bowl 46B on the first lavatory 22A side, is continuously provided from the end part of the partition wall 32 to the front wall 36, between the skirt section 56 and the bowls 46A, 46B, and partitions the first and second lavatories 22A, 22B above the bowls 46A, 46B.

The storage racks 52 are partitioned by a section 3202 of the partition wall 32, top decorative panels 50, a bottom plate 5202, a ceiling wall 38 and a front wall 36.

A long and narrow mirror 54 is secured vertically in the middle of the top decorative panel 50 in the widthwise direction, and the section of the top decorative panel 50 to which the mirror 54 is secured is openably and closeably provided.

The skirt section 56 is provided on the bottom of the bottom plate 5202, opposes the bowl 46A from some distance above the bowls 46A, 46B, and ensures sufficient space for hand-washing below the skirt section 56 and above the bowls 46A, 46B.

A water faucet button 44C and a liquid soap dispenser button 44D are provided on this skirt section 56.

Respective trash chutes 62 are provided at a position on the bottom decorative panel 58 located in the first lavatory 22A and a position on the bottom decorative panel 58 located in the second lavatory 22B, and a single trash receptacle 64 shared by the first and second lavatories 22A, 22B is provided in the storage chamber 60.

The trash receptacle 64 has a single trash can 66 and a single fire extinguisher 68.

The trash can 66 is put in and taken out from the storage chamber 60 through an opening provided on the front wall 36 or an opening provided on the bottom decorative panel 58 not depicted in the drawings. These openings are sealed with a lid plate.

In addition, as in the first embodiment, the toilet 41 in the respective lavatories 22A, 22B are disposed inclined at an angle θ relative to the partition wall 32, so that the center lines L passing through the centers of the toilets 41 in the widthwise direction are farther from the partition wall 32 as they reach the front of the toilets 41.

According to the second embodiment, as in the first embodiment, by having a part of the bowls 46A, 46B protrude on the adjacent lavatory 22A, 22B side, sufficient area for washing hands within the bowls 46A, 46B is ensured, and additionally, sufficient space for washing hands above the bowls 46A, 46B is ensured, and the sizes of the bowls 46A, 46B protruding from the partition wall 32 into the first and second lavatories 22A, 22B are minimized, which is advantageous in minimizing the width W of an aircraft lavatory unit 18A.

In addition, in the second embodiment, as depicted in FIG. 8, the bowls 46A, 46B of the first and second lavatories 22A, 22B are disposed adjacently arranged in the lengthwise direction of the partition wall 32. When viewed in a plane, the bowl 46A of the first lavatory 22A is disposed adjacent to the front wall 36, and the bowl 46B of the second lavatory 22B is disposed adjacent to the rear wall 34 side of the bowl 46A of the first lavatory 22A.

The width W1 of the bowl 46A of the first lavatory 22A and the width W2 of the bowl 46B of the second lavatory 22B are formed with different sizes.

In addition, the depth D1 of the bowl 46A of the first lavatory 22A and the depth D2 of the bowl 46B of the second lavatory 22B are formed with the same sizes.

In this case, since FIG. 8 is a cross-sectional view of FIG. 7 along a line A-A, the depth D1 of the bowl 46A is the size of the external form of the bowl 46A section in the width W direction of the aircraft lavatory unit 18A, including the thickness of the wall 74 partitioning the first lavatory 22A and second lavatory 22B at the back side of the bowl 46A, when cutting a portion directly above the bowl 46A by a plane parallel to the bottom wall 26 of the body frame 24 and viewed down from the plane. Furthermore, the widthwise direction W of the aircraft lavatory unit 18A is also a direction orthogonal to the partition wall 32.

Similarly, the depth D2 of the bowl 46B is the size of the external form of the bowl 46B section in the width W direction of the aircraft lavatory unit 18A, including the thickness of the wall 74 partitioning the first lavatory 22A and second lavatory 22B at the back side of the bowl 46B, when cutting a portion directly above the bowl 46B by a plane parallel to the bottom wall 26 of the body frame 24 and viewed down from the plane.

In addition, as depicted in FIG. 7, parts of the bowls 46A, 46B of the two lavatories 22A, 22B that are ½ the depth D1 and D2 protrude from the lavatories 22A, 22B in which the bowls 46A, 46B are used, and from the partition wall 32 into the adjacent lavatories 22A, 22B.

By this, the sizes of the bowls 46A, 46B protruding from the partition wall 32 into the lavatories 22A, 22B are the same, and there is no unevenness in the depth D direction at the locations where the bowls 46A, 46B are arranged in the depth D direction of the aircraft lavatory unit 18A, which is advantageous in enhancing the design properties of the lavatories 22A, 22B.

Figure 11A:
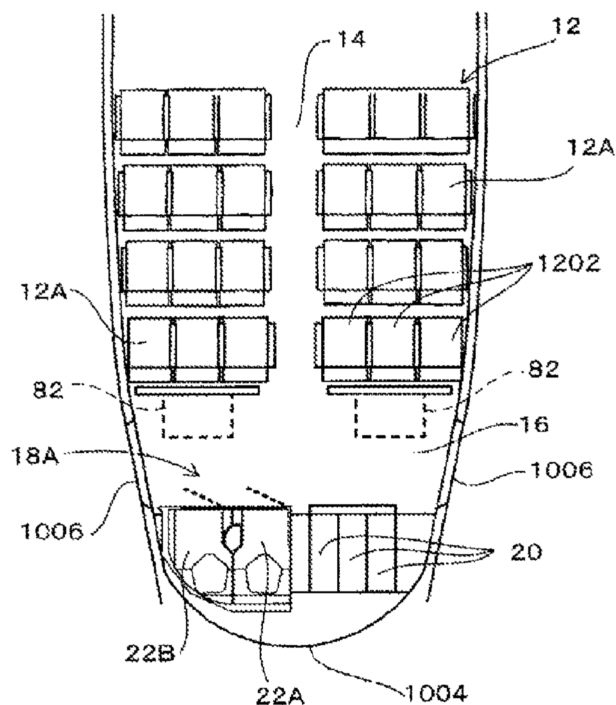
FIG. 11A and FIG. 11B are explanatory views each depicting the relationship between an aircraft lavatory unit and seat groups according to a first embodiment that have been installed within an aircraft.
Figure 12A:
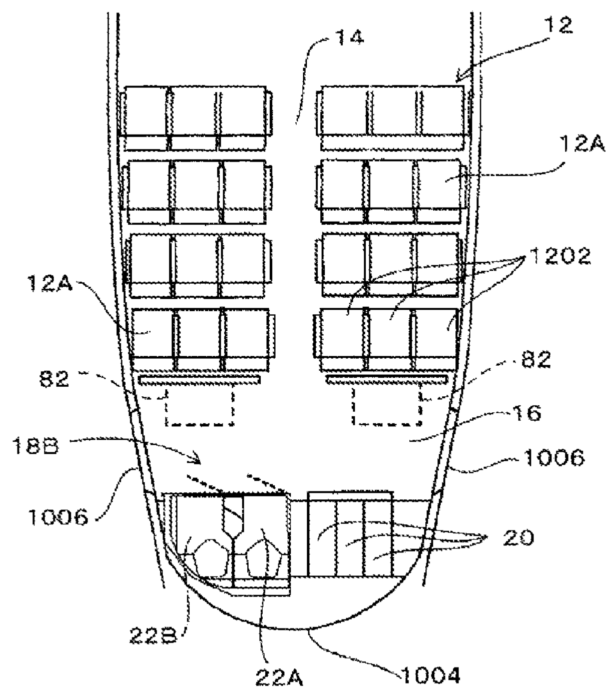
FIG. 12A and FIG. 12B are explanatory views each depicting the relationship between an aircraft lavatory unit and seat groups according to a second embodiment that have been installed within an aircraft.

As depicted in FIG. 11A and FIG. 12A, the first and second lavatories 22A, 22B in the aircraft lavatory units 18A, 18B in the first and second embodiments, for example, are both arranged in the latitudinal direction of the fuselage 10, to the rear of the latitudinal aisle 16 and to the front of the pressure bulkhead 1004 together with a plurality of galleys 20.

Figure 13:
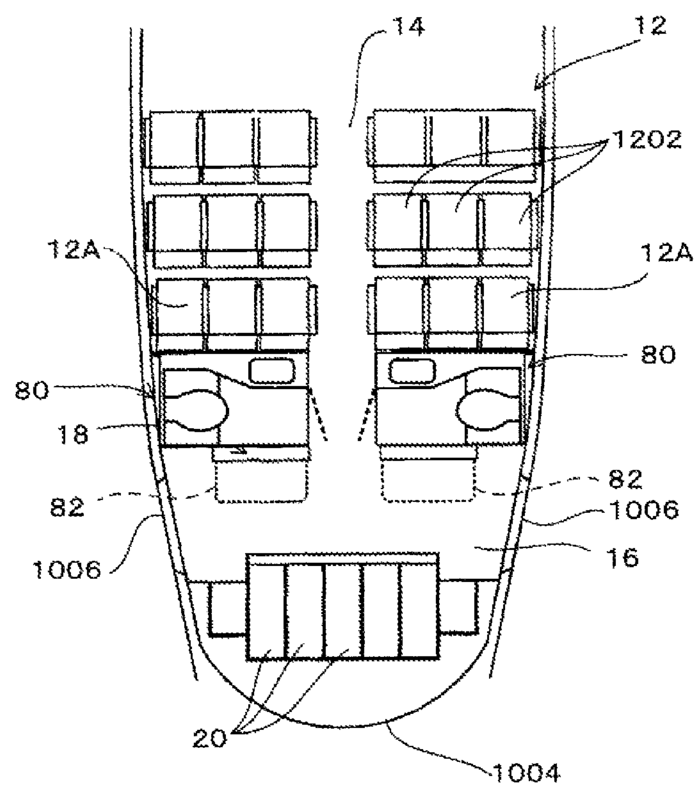
FIG. 13 is an explanatory view depicting the relationship between an aircraft lavatory unit and seat groups according to a conventional example that have been installed within an aircraft.

Consequently, as depicted in FIG. 13, compared to a conventional structural arrangement in which the toilet units 80 are respectively disposed on either side of the longitudinal aisle 14 to the rear of the seat row 12A positioned at the rear end of the seat groups 12, despite the space for the galleys 20 being reduced by the width for the aircraft lavatory units 18A, 18B, the width W of the aircraft lavatory units 18A, 18B has been shortened to minimum, so it is possible to provide two lavatories 22A, 22B while minimizing the reduction in space for the galleys 20. Thus, seat rows 12A respectively consisting of three seats 1202 are disposed in the locations where toilet units 80 would be disposed in a conventional example.

Consequently, it is possible to ensure a certain amount of space for the galleys 20, and additionally, provide six more seats 1202 while keeping the number of lavatories to two, and thus obtain aircraft lavatory units 18A, 18B advantageous in increasing the number of seats.

Furthermore, reference numeral 82 in FIG. 11 to FIG. 13 depicts flight attendant seats.

Figure 11B:
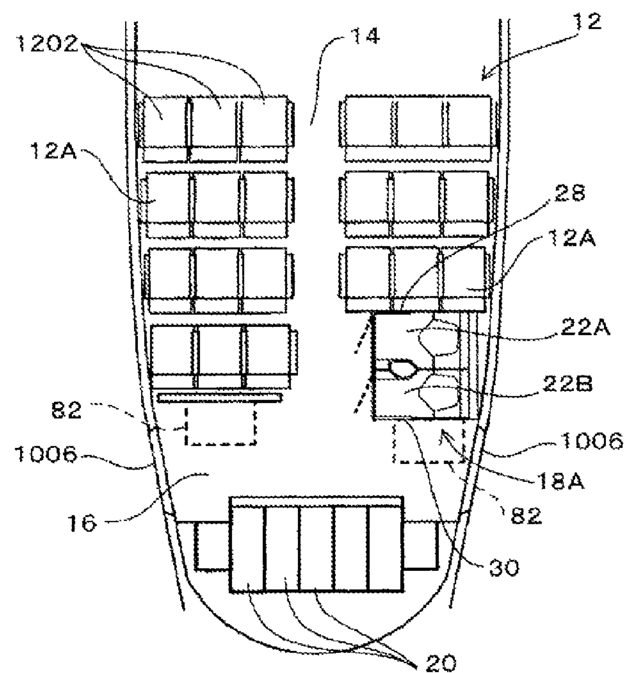
Figure 12B:
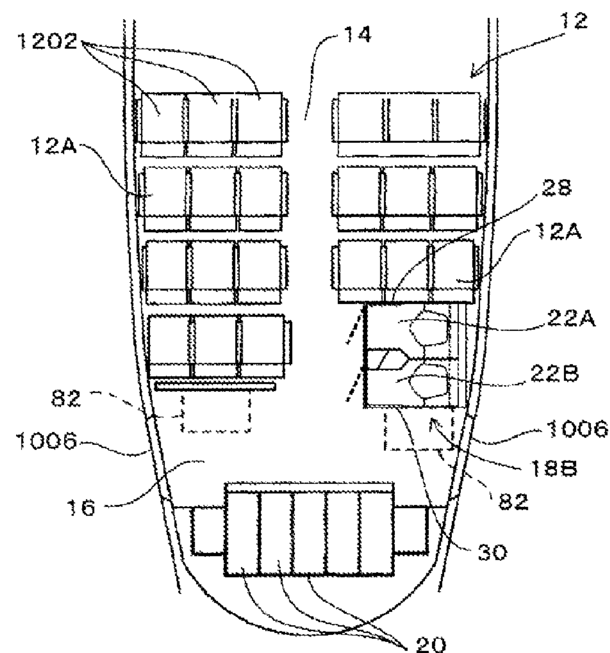

In addition, in the aircraft lavatory units 18A, 18B in the first and second embodiments, as depicted in FIG. 11B and FIG. 12B, for example, it is possible to bring the first side wall 28 close to the seat row 12A at the rear end of the seat groups 12 positioned on one side of the longitudinal aisle 14, and dispose the second side wall 30 parallel to the first side wall 28 opposing the latitudinal aisle 16, and dispose the front wall 36 opposing the longitudinal aisle 14. In which case, the rear wall 34 is formed into a curve along the body shape of the fuselage 10 in which the aircraft lavatory units 18A, 18B are installed, and the other walls are properly modified matching the rear wall 34.

Since the width W of the aircraft lavatory units 18A, 18B is shortened to minimum, even if two lavatories 22A, 22B are provided, by narrowing the gaps in front and in back of the seat rows 12A of the seat groups 12 on one side by several inches, 1 to 2 inches for example, it is possible to dispose the same number of seat rows 12A as the seat rows 12A of the seat groups 12 positioned on one side of the longitudinal aisle in the conventional example in FIG. 13.

Thus, it is possible to add one more seat row 12A consisting of three seats 1202 to the location of the toilet units 80 in the conventional example that are disposed to the rear end of the seat groups 12 on the other side of the longitudinal aisle, and therefore it is possible to provide three more seats 1202.

Consequently, compared to the conventional structural arrangement in FIG. 13, it is possible to provide three seats 1202 while keeping the number of lavatories to two, without narrowing the space of the galleys 20, and therefore to provide aircraft lavatory units 18A, 18B which are advantageous in increasing the number of seats.

What is claimed is:

1. An aircraft lavatory unit, comprising:
- two lavatories partitioned via a partition wall; and
- a hand-washing bowl provided for each of the two lavatories;
- the bowl of each of the two lavatories being provided on the partition wall;
- the bowl of a first lavatory of the two lavatories being disposed with a part protruding from the partition wall into a second lavatory side of the two lavatories; and
- the bowl of the second lavatory being disposed with a part protruding from the partition wall into a first lavatory side.

2. The aircraft lavatory unit according to claim 1, wherein:
- the partition wall has a height, and a length in a direction orthogonal to the height; and
- the bowls of the two lavatories are provided at locations with a same position along a lengthwise direction of the partition wall, and locations with different positions along a height direction of the partition wall.

3. The aircraft lavatory unit for an aircraft according to claim 2, further comprising:
- a single storage chamber covered by a decorative pane and provided straddling the two lavatories, below the bowl disposed on an underside of the two bowls disposed at locations with different positions along the height direction of the partition wall; and
- a trash receptacle including a single trash can shared by the two lavatories and a single fire extinguisher and provided in the storage chamber.

4. The aircraft lavatory unit according to claim 1, wherein:
- the partition wall has a height, and a length in a direction orthogonal to the height; and
- the bowls of the two lavatories are provided at locations with a same position along a height direction of the partition wall, and locations with different positions along a lengthwise direction of the partition wall.

5. The aircraft lavatory unit according to claim 4, wherein the bowls of the two lavatories are disposed adjacently arranged in the lengthwise direction of the partition wall.

6. The aircraft lavatory unit for an aircraft according to claim 5, further comprising:
- a single storage chamber covered by a decorative panel and provided straddling the two lavatories, below the two bowls adjacently arranged in the two lavatories; and
- a trash receptacle including a single trash can shared by the two lavatories and a single fire extinguisher and provided in the storage chamber.

7. The aircraft lavatory unit according to claim 1, wherein:
- the bowls of the two lavatories are formed to have a same depth which is a size in a direction orthogonal to the partition wall; and
- a part of the bowls of the two lavatories that is ½ the depth of the bowls protrudes from the lavatory in which the bowl is used, and from the partition wall into the adjacent lavatory.

8. The aircraft lavatory unit according to claim 1, wherein:
- a body frame of the aircraft lavatory unit includes a bottom wall, a pair of mutually opposing side walls standing up from the bottom wall, a mutually opposing rear wall and front wall standing up from the bottom wall in addition to the partition wall;
- the partition wall connects the rear wall and front wall between the pair of side walls;
- a toilet is disposed for each lavatory in front of the rear wall to enable sitting facing the front wall; and
- the bowl is provided on the partition wall at locations toward the front wall.

9. The aircraft lavatory unit according to claim 8, wherein the toilets are disposed inclined relative to the partition wall, so that center lines passing through centers of the toilets in a lateral widthwise direction are farther from the partition wall as they reach a front of the toilet.

10. The aircraft lavatory unit according to claim 2, wherein:
- the bowls of the two lavatories are formed to have a same depth which is a size in a direction orthogonal to the partition wall; and
- a part of the bowls of the two lavatories that is ½ the depth of the bowls protrudes from the lavatory in which the bowl is used, and from the partition wall into the adjacent lavatory.

11. The aircraft lavatory unit according to claim 3, wherein:
- the bowls of the two lavatories are formed to have a same depth which is a size in a direction orthogonal to the partition wall; and
- a part of the bowls of the two lavatories that is ½ the depth of the bowls protrudes from the lavatory in which the bowl is used, and from the partition wall into the adjacent lavatory.

12. The aircraft lavatory unit according to claim 4, wherein:

the bowls of the two lavatories are formed to have a same depth which is a size in a direction orthogonal to the partition wall; and a part of the bowls of the two lavatories that is ½ the depth of the bowls protrudes from the lavatory in which the bowl is used, and from the partition wall into the adjacent lavatory.

13. The aircraft lavatory unit according to claim 5, wherein:

the bowls of the two lavatories are formed to have a same depth which is a size in a direction orthogonal to the partition wall; and a part of the bowls of the two lavatories that is ½ the depth of the bowls protrudes from the lavatory in which the bowl is used, and from the partition wall into the adjacent lavatory.

14. The aircraft lavatory unit according to claim 6, wherein:

the bowls of the two lavatories are formed to have a same depth which is a size in a direction orthogonal to the partition wall; and a part of the bowls of the two lavatories that is ½ the depth of the bowls protrudes from the lavatory in which the bowl is used, and from the partition wall into the adjacent lavatory.

15. The aircraft lavatory unit according to claim 2, wherein:

a body frame of the aircraft lavatory unit includes a bottom wall, a pair of mutually opposing side walls standing up from the bottom wall, a mutually opposing rear wall and front wall standing up from the bottom wall in addition to the partition wall;

the partition wall connects the rear wall and front wall between the pair of side walls;

a toilet is disposed for each lavatory in front of the rear wall to enable sitting facing the front wall; and the bowl is provided on the partition wall at locations toward the front wall.

16. The aircraft lavatory unit according to claim 15, wherein the toilets are disposed inclined relative to the partition wall, so that center lines passing through centers of the toilets in a lateral widthwise direction are farther from the partition wall as they reach a front of the toilet.

17. The aircraft lavatory unit according to claim 3, wherein:

a body frame of the aircraft lavatory unit includes a bottom wall, a pair of mutually opposing side walls standing up from the bottom wall, a mutually opposing rear wall and front wall standing up from the bottom wall in addition to the partition wall;

the partition wall connects the rear wall and front wall between the pair of side walls;

a toilet is disposed for each lavatory in front of the rear wall to enable sitting facing the front wall; and the bowl is provided on the partition wall at locations toward the front wall.

18. The aircraft lavatory unit according to claim 17, wherein the toilets are disposed inclined relative to the partition wall, so that center lines passing through centers of the toilets in a lateral widthwise direction are farther from the partition wall as they reach a front of the toilet.

19. The aircraft lavatory unit according to claim 4, wherein:

a body frame of the aircraft lavatory unit includes a bottom wall, a pair of mutually opposing side walls standing up from the bottom wall, a mutually opposing rear wall and front wall standing up from the bottom wall in addition to the partition wall;

the partition wall connects the rear wall and front wall between the pair of side walls;

a toilet is disposed for each lavatory in front of the rear wall to enable sitting facing the front wall; and the bowl is provided on the partition wall at locations toward the front wall.

20. The aircraft lavatory unit according to claim 19, wherein the toilets are disposed inclined relative to the partition wall, so that center lines passing through centers of the toilets in a lateral widthwise direction are farther from the partition wall as they reach a front of the toilet.

* * * * *